(12) United States Patent
Zilliacus

(10) Patent No.: US 7,336,925 B2
(45) Date of Patent: Feb. 26, 2008

(54) GRAPHICAL INDICATION OF A PROXIMATELY LOCATED DEVICE

(75) Inventor: Martin Zilliacus, Kauniainen (FI)

(73) Assignee: Nokia Corporation, Espoo (FI)

( * ) Notice: Subject to any disclaimer, the term of this patent is extended or adjusted under 35 U.S.C. 154(b) by 355 days.

(21) Appl. No.: 10/281,222

(22) Filed: Oct. 28, 2002

(65) Prior Publication Data

US 2004/0203374 A1   Oct. 14, 2004

(51) Int. Cl.
H04B 7/00   (2006.01)

(52) U.S. Cl. .............. 455/41.2; 455/3.04; 455/3.005; 455/3.06; 455/414.1; 455/522; 725/131; 725/135; 725/139; 725/81

(58) Field of Classification Search ............ 455/414.1, 455/41.2, 102.1–102.3, 3.04, 3.05, 3.06, 455/522; 725/131, 135, 139, 81, 25
See application file for complete search history.

(56) References Cited

U.S. PATENT DOCUMENTS

| | | | |
|---|---|---|---|
| 5,761,606 A | 6/1998 | Wolzien | |
| 5,812,913 A | 9/1998 | Yuen | |
| 5,812,931 A | 9/1998 | Yuen | |
| 6,091,956 A | 7/2000 | Hollenberg | |
| 6,172,673 B1 | 1/2001 | Lehtinen et al. | |
| 6,230,325 B1 | 5/2001 | Iinuma et al. | |
| 6,741,684 B2 * | 5/2004 | Kaars ................ | 379/110.01 |
| 6,762,773 B2 * | 7/2004 | Kolde et al. ............ | 715/716 |
| 6,796,555 B1 * | 9/2004 | Blahut .................... | 370/395.1 |

| | | | |
|---|---|---|---|
| 2002/0010763 A1 | 1/2002 | Salo et al. | |
| 2002/0047916 A1 | 4/2002 | Miyagi et al. | |
| 2003/0025738 A1 * | 2/2003 | Polgar et al. ............ | 345/835 |

FOREIGN PATENT DOCUMENTS

| | | |
|---|---|---|
| DE | 4422015 C1 | 8/1995 |
| EP | 0569311 | 11/1993 |

(Continued)

OTHER PUBLICATIONS

Akiwumi-Assani et al, "Multi-media terminal architecture", Philips Journal of Research, vol. 50(1), Jan. 1, 1996, pp. 169-184.

(Continued)

*Primary Examiner*—Jean Gelin
*Assistant Examiner*—Pierre-Louis Desir
(74) *Attorney, Agent, or Firm*—Banner & Witcoff, Ltd.

(57) ABSTRACT

A system for displaying a graphical indication of a proximately located device is disclosed. When a mobile terminal (e.g., a mobile telephone) equipped with short-range communications (e.g., Bluetooth or wi-fi) as well as conventional long-range communications capabilities comes within range of set top box (e.g., a digital broadcast receiver), the set top box (STB) overlays an icon over the broadcast screen image indicating that a mobile terminal is present that can be used as a back channel to the cable operator. The overlaid icon may be presented in differing colors to indicate various characteristics of the mobile terminal, e.g., a type of the mobile terminal (phone vs. PDA) or a capability of the mobile terminal (e.g., ability to establish a GPRS or other data connection). A user of the STB can then use interactive services offered by the cable operator, and deliver interactive selections and commands to the cable operator via the mobile terminal back channel.

15 Claims, 4 Drawing Sheets

FOREIGN PATENT DOCUMENTS

| | | |
|---|---|---|
| EP | 0999678 | 5/2000 |
| EP | 1 059 809 | 12/2000 |
| EP | 1059809 | 12/2000 |
| EP | 1 180 903 A1 | 2/2002 |
| GB | 2294132 | 4/1996 |
| GB | 2307628 | 5/1997 |
| GB | 2 381 158 | 4/2003 |
| WO | WO 96/42144 | 12/1996 |
| WO | WO96/42144 | 12/1996 |
| WO | WO98/52105 | 11/1998 |
| WO | WO99/04568 | 1/1999 |
| WO | WO 00/44168 | 7/2000 |
| WO | WO 00/57657 | 9/2000 |
| WO | WO 01/15450 | 3/2001 |
| WO | WO 01/48715 | 7/2001 |
| WO | WO 02/03698 | 1/2002 |
| WO | 02/21835 A1 | 3/2002 |
| WO | WO 02/32115 | 4/2002 |

OTHER PUBLICATIONS

Balakrishnan et al "Digital video and the national information infrastructure" Philips Journal of Research, vol. 50(1), Jan. 1, 1996, pp. 105-129.

Technik, "Datenrundfunk mit DAB", Oct. 13, 1995, No. 22, Poing, DE, pp. 45-48.

Salkintzis et al., "An In-Band Power-Saving Protocol For Mobile Data Networks", IEEE Transactions on Communications, vol. 46, No. 9, Sep. 1998, pp. 1194-1205.

Salkintzis et al., "Performance Analysis Of A Downlink MAC Protocol With Power-Saving Support", IEEE Transactions on Vehicular Technology, vol. 49, No. 3, May 2002, pp. 1029-1040.

"Datenrundfunk mit DAB", Technik, 202 Funkschau, Oct. 13, 1995, Poing, DE, pp. 45-48.

Complete translation into English of pp. 45-48 of "Datenrundfunk mit DAB" entitled :Data Broadcasting With DAB Technology, 202 Funkschau, Oct. 13, 1995, Poing, Germany.

English language Abstract of pp. 45-48 of Datenrundfunk mit DAB, Technik, 202 Funkschau, Oct. 13, 1995, Poing, DE.

International Search Report, Int'l, Appl. No. PCT/IB03/04393.

* cited by examiner

GRAPHICAL INDICATION OF A PROXIMATELY LOCATED DEVICE

FIELD OF THE INVENTION

The invention relates to data transmission. More particularly, the invention relates to systems and methods for communicating between a mobile terminal and a display system such as a set top box.

BACKGROUND OF THE INVENTION

As cable television operators (including satellite and terrestrial transmissions) provide more services to users, interactivity with the user is increasingly prevalent. For example, users can presently use "on demand" services to request a program and instantly watch that program on the television, without being required to wait for a predetermined start time for the desired program (as is the case with known "pay-per-view" systems). The user typically navigates a menu system under the control of a set top box (STB) to select a program. The user's selection is sent to the cable operator via a back channel, i.e., the channel carrying data from the end user to the cable operator, and the cable operator sends the requested program to the user's STB for further presentation on a connected display such as a standard television, high-definition television, plasma flat panel display, or the like. Other known interactive services include voting, betting, and ordering food, e.g., as provided by BskyB in the United Kingdom. A request is typically sent to the cable operator on the back channel, and the requested data is inserted in the broadcast stream back to the user.

Known back channel mechanisms include fixed telephone lines, Asymmetric Digital Subscriber Line (ADSL), DVB-RCC, and digital cable/cable modems. However, use of a fixed telephone line is not preferable because, obviously, the user cannot use the fixed telephone line when it is in use by the STB to communicate commands back to the cable operator. Likewise, the STB cannot communicate commands when the fixed telephone line is otherwise in use. A user can purchase a separate fixed telephone line for use as a back channel, but this incurs an often unwanted or unacceptable additional expense to the user. In addition, there is no way for a user using the STB to know whether the fixed telephone line is in use other than to pick up a telephone connected to the fixed telephone line and check for a dial tone, and a fixed telephone line or ADSL jack is often not physically located near the television set, making connection difficult, inconvenient, and more expensive.

While ADSL and cable-based solutions do not impose the same limitations as fixed telephone lines, ADSL and cable-based solutions presently do not have widespread coverage areas, or footprints (e.g., the "last mile" problem). In addition, it may take quite some time, e.g., a decade or more, before providers increase their respective footprints, due to expensive upgrade and installation costs for the necessary hardware and infrastructure by both the cable operator and end users. Contract and legal complexities have added to the delay of broadband interactive services as well.

Thus, it would be an advancement in the art to provide a back channel that does not require substantial infrastructure upgrade and investment. It would be a further advancement in the art to provide a mechanism to inform a STB user whether the back channel is available, when the back channel is not constantly available.

BRIEF SUMMARY OF THE INVENTION

To overcome limitations in the prior art described above, and to overcome other limitations that will be apparent upon reading and understanding the present specification, the present invention is directed to a system for detecting when a mobile terminal that can be used as a back channel is within range of a set top box, and overlaying an indicator icon over a broadcast image to indicate to a user the availability of the mobile terminal and/or back channel.

An aspect of the invention provides a method for displaying an indicative icon by establishing a connection with a mobile terminal via a short-range transceiver, determining a characteristic of the mobile terminal, and overlaying an icon on a video signal based on the characteristic of the mobile terminal, e.g., a mobile telephone. In some embodiments the characteristic may include a type of the mobile terminal. In others it may include a capability of the mobile terminal, such as the capability to establish a data connection back channel with a cable operator.

According to another aspect of the invention, a mobile terminal can be used to relay user commands and selections from a set top box to a corresponding cable operator. The mobile terminal establishes a short-range wireless connection with a set top box. Once established, the mobile terminal may establish a data connection with a cable operator for use as a back channel by the set top box. The mobile terminal then receives a user selection of an interactive service from the set top box, and relays the selection by sending it to the cable operator over the data connection being used as a back channel.

According to another aspect of the invention, a set top box can overlay an icon over a broadcast signal, where the icon is indicative of the availability of a mobile terminal for use as a back channel to a cable operator. The icon may also indicate the availability of interactive services. The set top box includes a short-range transceiver for communicating with the mobile terminal, an overlay module that overlays the icon over the received video broadcast signal while the short-range transceiver is communicating with the mobile terminal, and a video encoder that outputs the modified video broadcast signal with overlaid icon for display on a display device, such as a television.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1:
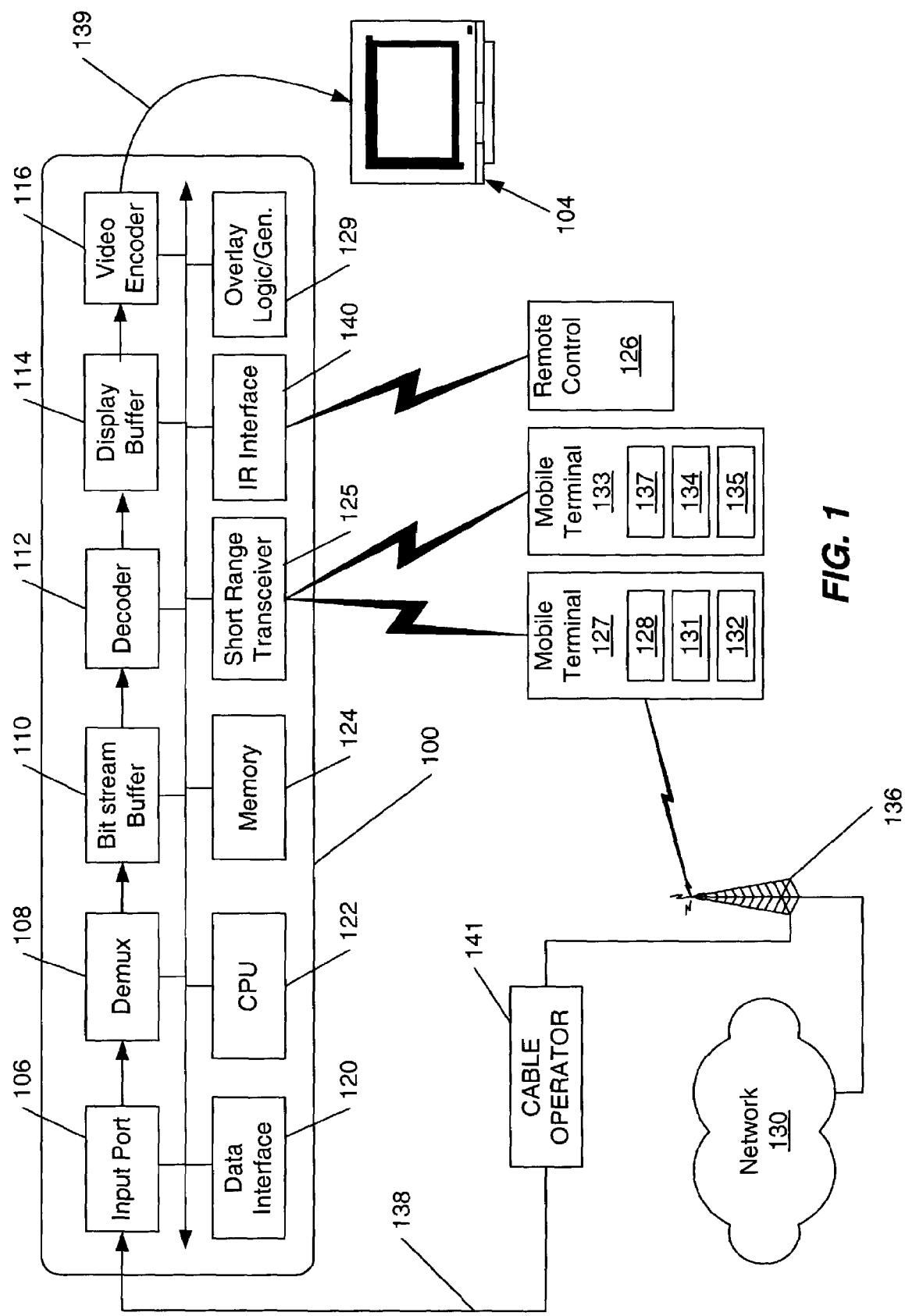
FIG. 1 illustrates a block diagram of a hardware architecture according to an illustrative embodiment of the invention.

FIG. 1 shows a system for receiving and processing digital video signals in accordance with an embodiment of the invention. A digital broadcast receiver (set-top box, or STB) 100 may be coupled to a television 104. The digital broadcast receiver may optionally be integrated with television 104 as a single unit. A digital input stream 138 is received at input port 106 from cable television operator 141. The digital input stream may have a format such as DVB-S, DVB-C, DVB-T, MPEG-1, MPEG-2, MPEG-4 or ISO-IEC standards 11172-1, 11172-2 and 11172-3. The digital input stream may also use a format disclosed by the Bluetooth Special Interest Group. Any other digital or analog transmission format may alternatively be used. Video and audio programs may be transmitted to digital broadcast receiver 100 over a variety of different frequencies and/or in a multiplexed manner over a single carrier. A demultiplexer 108 may be included to isolate a desired audio or video program from the input stream. The isolated program may then be sent to a bit stream buffer 110. Bit stream buffer 110 buffers data that is sent to a decoder 112. Decoder 112 may be included to decode or descramble signals broadcast in a compressed format such as in an MPEG-1 or MPEG-2 format. In one embodiment, the output of decoder 112 is a baseband signal. The baseband signal leaving decoder 112 may then be transmitted to display buffer 114 before being transmitted to a video encoder 116. Video encoder 116 may then convert the baseband signal to a formatted signal 139 that can be used by a television, such as the National Television Standards Committee (NTSC) standard or the Phase Alternating Line (PAL) standard. An overlay logic and generation module 129 may overlay graphical images over the formatted signal, as further described below.

Digital broadcast receiver 100 also includes a short-range transceiver 125 for communicating with wireless devices within a wireless personal area network (WPAN). In a preferred embodiment, short-range transceiver 125 supports communications according to the WPAN specification known as "BLUETOOTH." Information about this specification may be obtained from the Bluetooth Special Interest Group at the website www.bluetooth.com. Alternatively, short range transceiver 125 may communicate using IEEE 802.11-based standards (often referred to as Wi-Fi). Through the WPAN, multiple mobile terminal devices 127, 133 may communicate with receiver 100 and with each other within a certain range. As shown in FIG. 1, mobile terminal 127, 133 can communicate with receiver 100 via the WPAN using a short-range transceiver 128, 137 in the mobile terminal 127, 133, respectively. Further, mobile terminal 127, e.g., a handheld mobile terminal, may connect to the Internet 130 via telecommunications network 136. Receiver 100 may connect to the Internet via data interface 120. It may also access the Internet via mobile terminal 127. Mobile terminal 127, 133 may also include a processor 131, 134 for controlling operations of the mobile terminal according to computer executable instructions stored in memory 132, 135, respectively. Alternatively, some or all of mobile terminal's computer readable instructions may be embodied in hardware or firmware (not shown). Multiple mobile terminals 127, 133 may be within communication range of short-range transceiver 125.

The digital broadcast receiver 100 may optionally include an interface 120 for coupling the receiver to a computer device (not shown). An RS-232 interface may be utilized to provide a standard interface for connecting to additional devices. Of course, other interfaces, such as network, USB or IEEE 1394 interfaces may also or alternatively be included (not shown). A central processing unit (CPU) 122 may be included to control the overall operation of digital broadcast receiver 100. Computer executable instructions and data used by CPU 122 and other components within digital broadcast receiver 100 may be stored in a memory 124. Memory 124 may be implemented with any combination of read only memory modules or random access memory modules, optionally including both volatile and nonvolatile memory. A user may control the operation of digital broadcast receiver 100 with a remote control 126. A conventional infrared (IR) interface 140 may be included to receive information from the remote control 126.

Figure 2:
FIG. 2 illustrates a display screen according to an illustrative embodiment of the invention.

With further reference to FIG. 2, according to an illustrative aspect of the invention, STB 100 causes an icon 201 to be displayed on the screen 203 of television 104 when a mobile terminal (e.g., mobile terminal 127) is within range of short-range transceiver 125 so that STB 100 can communicate with the mobile terminal. That is, when the short-range transceiver 125 (e.g., a Bluetooth transceiver) of the STB 100 detects a mobile terminal within communication range, the icon 201 is displayed on the screen 203 of the television or other connected display device.

According to an aspect of the invention, the icon may be displayed in various colors to indicate different types of detected devices and/or services offered by the detected device. In one embodiment, a green icon may be displayed to indicate to the user that a back channel data connection with the cable operator or broadcast provider via the mobile terminal is ready and available. The data connection may be established via a GPRS connection or other wireless telecommunication data protocol. A GPRS or similar connection is preferable because the user can make and receive telephone calls simultaneously to the existence of the GPRS connection. Thus, when a green icon is displayed, the user knows that she may use interactive services available on the STB 100 and that the STB can communicate the user's commands back to the cable operator via a back channel through the mobile terminal, e.g., via telecommunications network 136 (FIG. 1).

A yellow icon may be displayed when a mobile terminal is detected within range of the short-range transceiver, but when the data connection back channel through the mobile terminal has not yet been established with the cable operator. Thus, the user knows that any available interactive services may be used after establishing the data connection for the back channel through the mobile terminal. The user may establish the data channel manually or, alternatively, the STB 100 via the short-range transceiver can instruct the mobile terminal 127 to establish a GPRS connection with the cable operator 141.

A red icon may be displayed when a mobile terminal (e.g., mobile terminal 133) is within range of the short-range transceiver 125, but the mobile terminal 133 is either not recognized or is not capable of providing a back channel to the cable operator (e.g., Bluetooth headphone speakers). A gray icon may be used to indicate that a mobile terminal capable of providing a back channel is within range and ready, but that there are no presently available interactive services. As will be appreciated by one of skill in the art, other colors may alternatively be used, as well as colors to indicate other ready/not ready states.

With reference back to FIG. 1, overlay logic and generator 129 may combine broadcast input stream 138 with an overlay image, e.g., icon 201, to produce a composite signal 139. Broadcast input stream 138 may include an indication of available interactive services available (e.g., as metadata sent with the broadcast stream), and short-range transceiver 125 may provide an indication of when a mobile terminal is detected and when a back channel is available. The overlay logic and generator 129 uses the combination of available interactive services and available detected device(s) with any available back channel to determine whether to overlay an icon and, if so, to determine which icon color to overlay.

According to another illustrative aspect of the invention, different icons can be displayed on the television screen to indicate a type of device detected by the short-range transceiver. For example, an icon depicting a mobile telephone may be displayed to indicate that a mobile telephone is detected. Similarly, an icon depicting a personal digital assistant may be displayed to indicate that a wireless PDA is detected.

Figure 3:
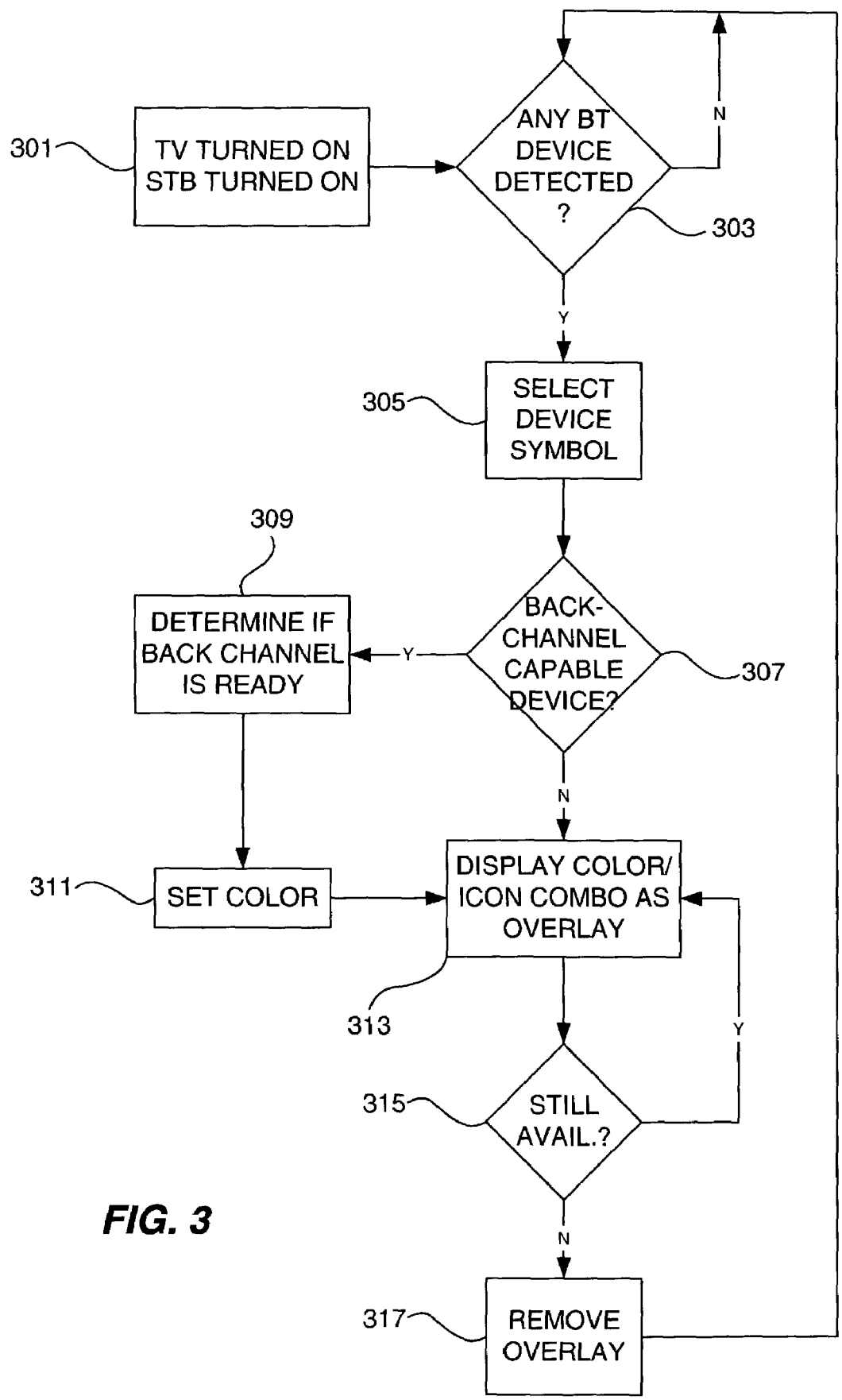
FIG. 3 illustrates a method for determining an icon to display according to an illustrative embodiment of the invention.

FIG. 3 illustrates a method for determining an icon and color to display on a television screen according to an illustrative embodiment of the invention. In step 301 a television 104 and corresponding STB 100 are turned on and initialized to a ready state. STB 100 waits in step 303 until a device is detected by the short-range transceiver, e.g., a Bluetooth enabled device. STB 100, in step 305, determines an icon to display based on the detected device and, in step 307, determines whether the detected device is capable of providing a back channel. If the detected device is capable of providing a back channel, then in step 309 the STB 100 determines whether the back channel is ready. That is, the STB 100 determines, based on information received from the detected device, whether the back channel has already been established. In step 311, based on whether the back channel has been established and based on the detected device, the STB 100 selects an appropriate color for the icon and, in step 313, displays the icon in the selected color. If in step 307 the device is determined not to be capable of providing a back channel, STB 100 in step 313 displays a default icon in a default color to indicate as much. STB 100 in step 315 determines whether the detected device is still available, and as long as it is, continues displaying the icon in the appropriate color. When the detected device is no longer available, STB 100 removes the overlay icon in step 317 and returns to step 303 to wait until another device is detected by the short-range transceiver 125.

Thus, using the above method, the back channel icon may be displayed when the Bluetooth connection between the STB and the mobile terminal has been established and is OK, the mobile terminal has optionally been set up as one alternative back channel (e.g., through a setup screen, where the user authorizes use of the mobile terminal, possibly incurring costs with the user's wireless provider), and the GPRS connection is detected and set up by the mobile terminal.

In one embodiment of the invention, the mobile terminal may act similar to a modem, just passing data from the STB to the cable operator's server. In this embodiment, the back channel setup information may be maintained on the STB, and the mobile terminal merely acts as an accessory to the STB.

Figure 4:
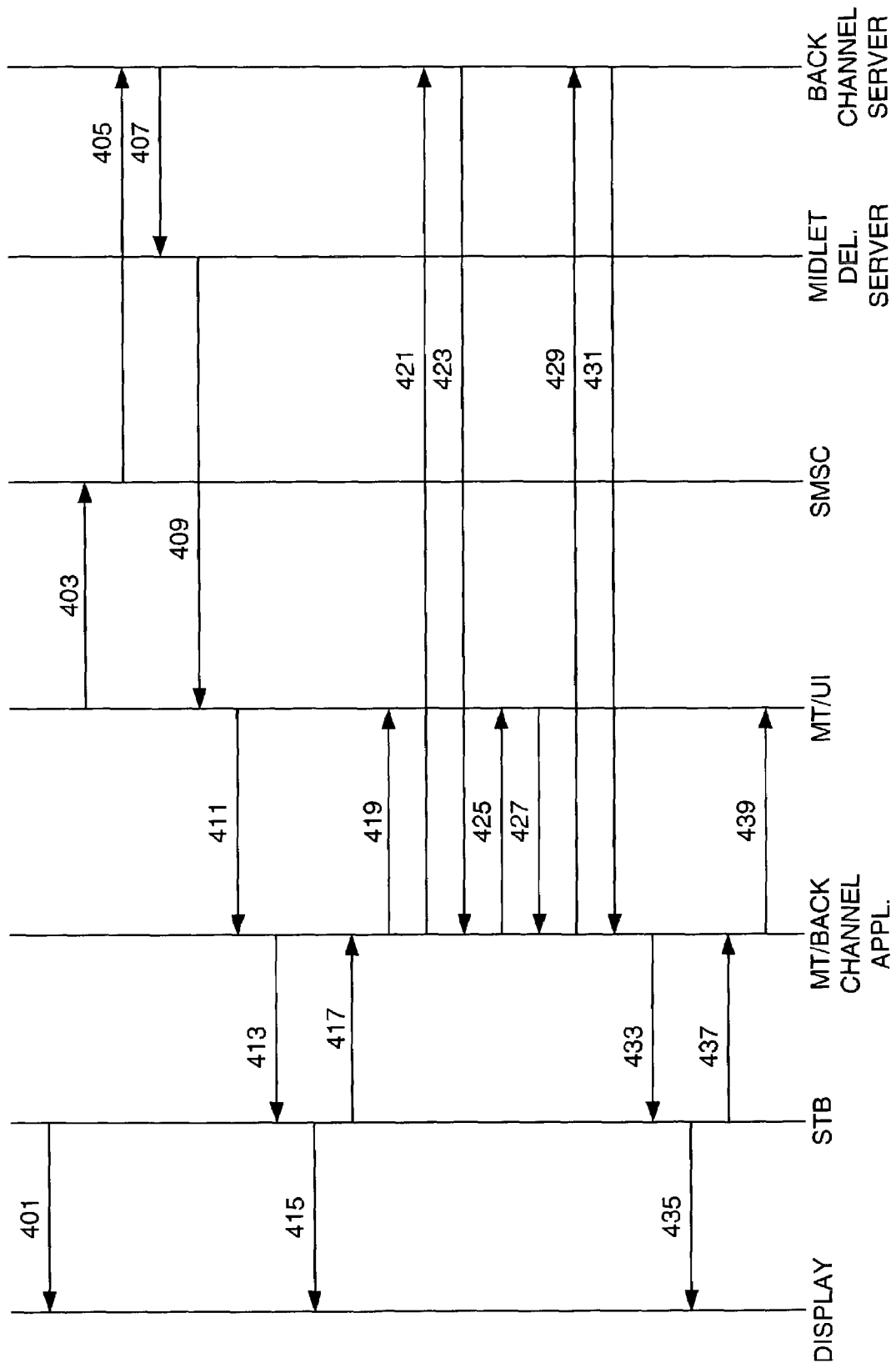
FIG. 4 illustrates a method for establishing a back channel controlled by a mobile terminal, according to an illustrative embodiment of the invention.

In another embodiment, with reference to FIG. 4, an application executing on the mobile terminal may oversee establishment and maintenance of the back channel. In such an embodiment, the application executing on the mobile terminal may establish the GPRS connection with the cable operator's server, and establish and maintain a connection with the STB while the mobile terminal is within range of the STB.

In FIG. 4, prior to step 401, interactive services are not available on the STB. As a result, in step 401, the STB (e.g., STB 100) causes a symbol to be overlaid and displayed on the television (e.g., television 104) indicating that the back channel is inactive. In step 403, a user may request, via the mobile terminal's user interface, that a back channel be established, resulting in the mobile terminal (MT) sending an SMS message to an appropriate SMSC. The SMSC, in step 405, sends the service request SMS message to a broadcast provider's back channel server.

In step 407, the back channel server instructs the midlet delivery server to send the back channel application program to the mobile terminal (e.g., by indicating the mobile terminal's telephone number), and in step 409 the midlet delivery server sends the application to the mobile terminal. In step 411, the back channel application is launched, and in step 413 the application sends the mobile terminal's identifier to the STB. The STB may optionally display a new symbol in step 415 indicating that the back channel is being configured. 1321 Subsequently, in step 417, the STB acknowledges the mobile terminal's identifier, and in step 419 the mobile terminal displays an indication that the mobile terminal has successfully set up communications with the STB. In step 421, the back channel application initiates communication with the back channel server by connecting to a URL associated with the back channel server. The back channel server sends a connection acknowledgement, along with any requested information, in step 423.

In step 425, the back channel application queries the user to authorize the establishment of the back channel, and in step 427 the user inputs such authorization. Subsequently, in step 429, the back channel application registers the back channel with the back channel server, receiving an acknowledgement from the back channel server in step 431. Once the mobile terminal and the back channel application establish the back channel with the back channel server, the back channel application informs the STB, in step 433, that a back channel has been successfully established. In step 435 the STB overlays a new symbol on the display indicating that the back channel is established and ready. In step 437 the STB acknowledges the indication from the back channel application that the back channel is established, and in step 439 the back channel application displays an acknowledgement on the mobile terminal's user interface that a back channel is in use. For example, the mobile terminal may display a text message indicating that the back channel establishment is complete. Alternatively, or in addition to the text message, the mobile terminal may display a television icon or other icon indicating to a user viewing a display screen of the mobile terminal that the mobile terminal is presently providing a back channel for the connected STB. In this manner, the user can receive a visual indication of the back channel by viewing either the display device attached to the STB, or by viewing a display of the mobile terminal.

Thus, subsequent to step 435, the user knows that the back channel is available for interactive services with the STB. Subsequent to step 439, the mobile terminal (via the back channel application) knows that the back channel is established and will send commands to the cable operator/broadcast provider via the established back channel.

Figure 5:
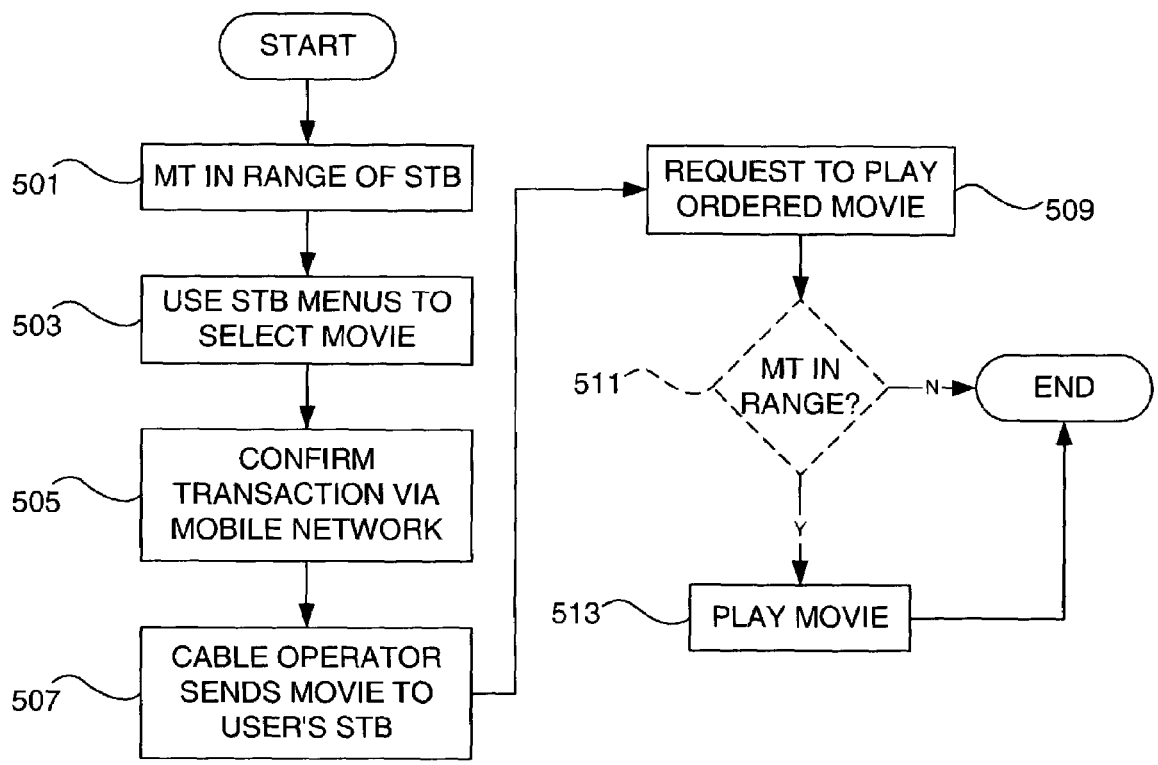
FIG. 5 illustrates a method for performing interactive services according to an illustrative embodiment of the invention.

Using the above-described system, with further reference to FIG. 5, a user can send commands to a cable operator via a back channel through a mobile terminal to perform an interactive service, e.g., to order a movie from the cable operator to send to the user's STB. In step 501, the user brings a mobile terminal within range of the STB and the short-range transceiver, and the STB indicates to the user that a back channel and interactive services are available by displaying the appropriately colored icon. In step 503 the user selects a desired movie by navigating through menus provided by the STB 100 (e.g., using the remote control). The menus are stored in the STB after download from the broadcast stream. The menus may be included as part of the interactive services provided by the cable operator, part of the Super Text TV (DVB/MHP), or part of a MHP application. Once the selection has been made, the STB 100, in step 505, sends the selection to the cable operator via the back channel through the mobile terminal. The order may include the movie selection, as well as identifying information regarding the STB 100 and/or the mobile terminal used for the back channel, e.g., mobile terminal 127 (FIG. 1). The cable operator in step 507 sends the movie to the STB 100 for storage, to be played back on an attached television.

Sometime later, in step 509, STB 100 receives a request from the user to play the movie. Optionally, STB may confirm in step 511 that the same mobile terminal used as a back channel is still within range before playing the movie. Operating under the assumption that a mobile terminal has a constant owner, this ensures that the user who ordered the movie gets to view it. In step 513 the STB plays back the movie via an attached television or other display device.

One of skill in the art will appreciate that modifications may be made to the above-described method. For example, the cable operator might not send the movie to a STB until the user requests to play the movie (i.e., the order of steps 507 and 509 is reversed). In such an embodiment, when the user requests to play the movie, the cable operator may deliver the movie to the STB with which the mobile terminal is currently communicating, regardless of the STB to which the mobile terminal was connected when the movie was selected. Thus, the user may select and order a movie using menus on a first STB, travel to another location where a second STB is located, and have the movie delivered to the second STB for viewing on an attached display device.

One or more aspects of the invention may be embodied in computer-executable instructions, such as in one or more program modules, executed by one or more computers, set top boxes, mobile terminals, or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

While the invention has been described with respect to specific examples including presently preferred modes of carrying out the invention, those skilled in the art will appreciate that there are numerous variations and permutations of the above described systems and techniques. For example, icons of various shapes, sizes, and colors may alternatively be used. Thus, the spirit and scope of the invention should be construed broadly as set forth in the appended claims.

I claim:

1. A set top box, comprising:
an input port configured to receives a video broadcast signal;
a short-range transceiver configured to communicating with mobile terminals within a coverage area of the short-range transceiver providing an interface for detecting at least one mobile terminal entering the coverage area and determining whether the at least one detected mobile terminal is capable of hosting a back channel to a broadcast provider that provides the video broadcast signal;
an overlay module configured to modify the video broadcast signal including overlaying an icon over the received video broadcast signal in response to determining that the short-range transceiver is communicating with the at least one mobile terminal capable of hosting a back channel; and
a video encoder configured to outputs the modified video broadcast signal for display on a display device.

2. The set top box of claim 1, wherein the video broadcast signal comprises a digital video signal.

3. The set top box of claim 1, wherein the short-range transceiver comprises a short-range RF transceiver.

4. The set top box of claim 1, wherein the overlay module is configured to select the icon from a plurality of icons based on a type of the mobile terminal.

5. The set top box of claim 1, wherein the overlay module is configured to select a color of the icon from a plurality of colors based on a status of availability of the back channel.

6. The set top box of claim 1, wherein the overlay module is configured to select a color of the icon from a plurality of colors based on a status of availability of interactive services.

7. The set top box of claim 1, further comprising a television.

8. The set top box of claim 1, wherein the overlay module modifies the video broadcast signal when a back-channel is established with the broadcast provider via the mobile terminal.

9. A broadcast signal receiver comprising:
a broadcast stream input port configured to receive a broadcast data signal from a broadcast provider;
a short-range RF transceiver configured to detect RF-enabled mobile terminals entering a coverage area and determining whether at least one of the detected mobile terminals is configured to host a back-channel to the broadcast provider that provides the broadcast signal, wherein upon determining at least one detected mobile terminal is configured to host a back-channel, communicating with the at least one short-range RF-enabled mobile terminal configured to host a back channel to the broadcast provider that provides the broadcast data signal;
an overlay logic module for modifying the broadcast data signal by overlaying an icon over the input broadcast data signal when a back channel has been established through the short-range RF-enabled mobile terminal to the broadcast provider; and
an output port for outputting the modified broadcast data signal for display on a display device.

10. The broadcast signal receiver of claim 9, wherein the broadcast data signal comprises a digital video signal.

11. The broadcast receiver of claim 9, wherein the overlay module selects the icon from a plurality of icons based on a type of the mobile terminal.

12. The broadcast receiver of claim 9, wherein the overlay logic module selects a color of the icon from a plurality of colors based on a status of availability of the back channel.

13. The broadcast receiver of claim 9, wherein the overlay modules selects a color of the icon from a plurality of colors based on a status of availability of interactive services.

14. The broadcast receiver of claim 9, further comprising a television.

15. A method comprising:
receiving a video broadcast signal;
communicating with mobile terminals within a coverage area of the short-range transceiver and providing an interface for detecting at least one mobile terminal entering the coverage area configured to determine whether the at least one detected mobile terminal is capable of hosting a back channel to a broadcast provider that provides the video broadcast signal;
modifying the video broadcast signal including overlaying an icon over the received video broadcast signal in response to determining that the short-range transceiver is communicating with the at least one mobile terminal capable of hosting a back channel, wherein the overlay module selects the icon from a plurality of icons based on criteria selected from the group consisting of: the type of the mobile terminal, characteristics of the mobile terminal, capabilities of the mobile terminal and combinations thereof.

* * * * *

UNITED STATES PATENT AND TRADEMARK OFFICE
CERTIFICATE OF CORRECTION

PATENT NO.         : 7,336,925 B2
APPLICATION NO. : 10/281222
DATED                  : February 26, 2008
INVENTOR(S)        : Martin Zilliacus It is certified that error appears in the above-identified patent and that said Letters Patent is hereby corrected as shown below:

On claim 1, column 8, line 8
"receives" should read --receive--

On claim 1, column 8, line 10
"communicating" should read --communicate--

On claim 1, column 8, line 24
"outputs" should read --output--

On claim 13, column 9, line 10
"modules selects" should read --logic modules selects--

On claim 15, column 9, line 17
"area of the short-range" should read --area of a short-range--

On claim 15, column 10, line 10
"wherein the overlay" should read --wherein an overlay--

Signed and Sealed this

Tenth Day of June, 2008

JON W. DUDAS
*Director of the United States Patent and Trademark Office*